United States Patent
Llorente Gonzalez

(10) Patent No.: US 7,918,633 B2
(45) Date of Patent: Apr. 5, 2011

(54) SUPPORT FOR THE TRANSPORT OF BLADES

(75) Inventor: Jose Ignacio Llorente Gonzalez, Pamplona (Navarra) (ES)

(73) Assignee: Gamesa Innovation & Technology, S.L., Pamplona (Navarra) (ES)

(*) Notice: Subject to any disclaimer, the term of this patent is extended or adjusted under 35 U.S.C. 154(b) by 0 days.

(21) Appl. No.: 12/079,600

(22) Filed: Mar. 27, 2008

(65) Prior Publication Data
US 2009/0003957 A1    Jan. 1, 2009

(30) Foreign Application Priority Data
Mar. 30, 2007  (ES) .................................. 200700850

(51) Int. Cl.
*B60P 7/08*  (2006.01)
(52) U.S. Cl. ............... 410/45; 410/34; 410/44; 410/87; 410/120
(58) Field of Classification Search ............... 410/44, 410/45, 46, 31, 32, 34, 43, 87, 88, 120; 414/459–461; 280/404; 220/1.5
See application file for complete search history.

(56) References Cited

U.S. PATENT DOCUMENTS
| 2,469,156 | A | 5/1949 | Cargil |
| 2,708,509 | A | 5/1955 | Gould et al. |
| 5,628,403 | A | 5/1997 | Thomas et al. |
| 7,429,156 | B2 * | 9/2008 | Jensen ............... 410/45 |

FOREIGN PATENT DOCUMENTS
| WO | 03/057528 | 7/2003 |
| WO | 03/076307 | 9/2003 |
| WO | 2006/061806 | 6/2006 |
| WO | 2006/053931 | 9/2007 |

OTHER PUBLICATIONS
English Abstract of WO2006/053931, May 26, 2006.
* cited by examiner

*Primary Examiner* — Stephen Gordon
(74) *Attorney, Agent, or Firm* — Ladas & Parry LLP

(57) ABSTRACT

Support which absorbs the torsion to which blades are subjected during transport, comprising a set of pins (17) inserted in the floor (8) of the container (1) and to the sides of a hollow pipe (21), which connect by means of a clevis (18) to different rods (19) secured with fastening pins (20) that facilitate the lengthways and angular rotation of the unit. The first support is located at a distance "d" from the leading edge of the cradle (9), next to the platform (16) formed between the ribs (15) which run through the lower shell (14). The second support is located on the other side of the platform (16) also inserted between the aforementioned ribs (15). Both supports are inclined at an angle α in relation to the floor (8), each forming articulated quadrilaterals.

6 Claims, 4 Drawing Sheets

Section VI-VI

SUPPORT FOR THE TRANSPORT OF BLADES

FIELD OF THE INVENTION

This invention refers to a support used inside a container in which wind turbine blades are transported. The support enables the stresses to which the blades may be subjected at critical moments to be absorbed.

BACKGROUND OF THE INVENTION

The applicant of this invention has a previous patent which presents a container formed by a modular structure able to be adapted to the different blade lengths depending on the wind turbine model to be assembled. Thus, patent WO2006053931 presents a structure formed by a set of trusses and bars joined together to form a container inside which at least three blades can be arranged in a horizontal position, Cradles allow the weight to be supported at intermediate points of the blade.

Now however, the current length of blades and the tendency to increase that length with new wind turbine models capable of generating greater levels of power represents a serious problem for the transport of said blades. When moving the container around a sharp or slightly inclined bend, further stresses appear. Said stresses are transmitted from the container to the intermediate cradles and ultimately transmitted them to the blades themselves due to the rigidity of said cradles.

An analysis of the torsion appearing in situations similar to the one mentioned above shows a localised pressure at specific places on the blade, and the observation of the points where the pressure is produced has lead to the search for a solution to this situation.

DESCRIPTION OF THE INVENTION

One object of this invention is to provide a container with one or various cradles on which the blades can be housed. The cradles currently known in the state of the art are rigid, the pressures that they receive via the container are therefore transmitted directly to the blade. The blade is comprised of a beam covered by two shells, one upper and one lower. Said shells are not structural elements since the structural element of the blade is the beam. Therefore, the shells are more affected by the pressures received via the cradle and are more easily damaged. In order to prevent damage, another object of this invention is to provide some elements which support the cradle and are capable of absorbing the torsion to which the blades are subjected.

The supports are formed by different elements, preferably metal, which form a stepped and symmetrical unit comprising pins which connect with the container itself, rods which connect the pins to an upper pipe by means of the aforementioned clevis pins and fastening pins which pass through the clevis allowing rotation.

The supports are arranged underneath each cradle, using at least one pair of supports for each one and acting as a connecting line between the container structure and the cradles.

All of the items detailed above result in the following advantages. The use of the supports described prevents the blades from being subjected to torsion during transport. These supports can be added to existing transport containers easily and quickly.

In order to facilitate the explanation, this document is accompanied by a document containing drawings showing a practical embodiment of this invention.

DESCRIPTION OF A PREFERRED EMBODIMENT

Figure 1:
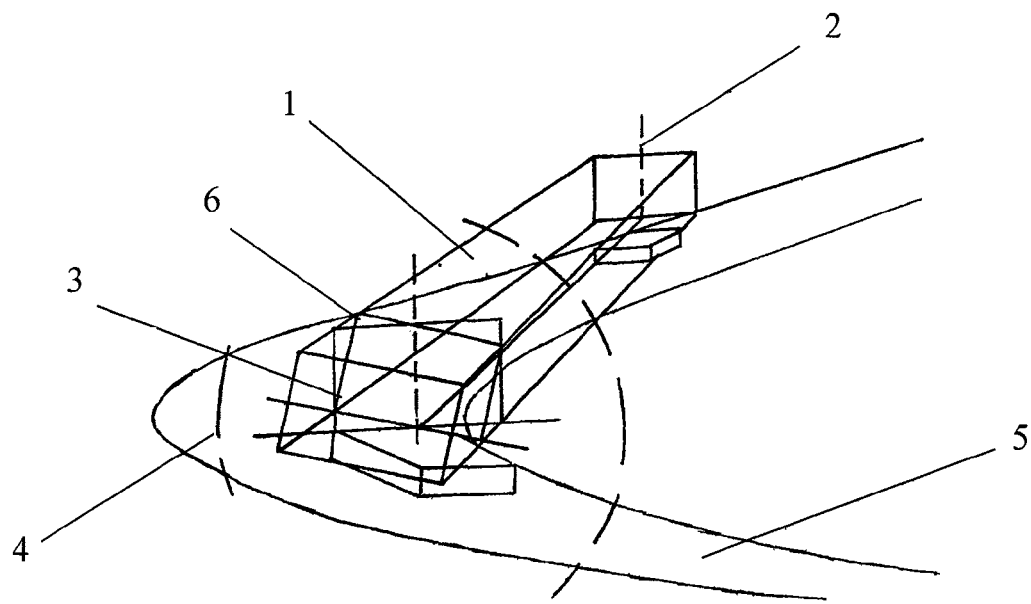
FIG. 1 is a general view of the transport container in a particular arrangement showing the torsion to which it is subjected.

As shown in FIG. 1, the blades are transported by means of a container (1) moved by any possible means of traction (not shown in the figure). In the preferred embodiment presented, the front part of the container (2) has traveled around a bend (4) in the road (5), whilst the rear part of the container (3) has still not passed around said bend (4). The position of the container (1) and the sloped terrain upon which the road (5) lies causes torsion shown by the planes representing the two rectangular sections (6) in an area close to the rear of the container (3).

Figure 2:
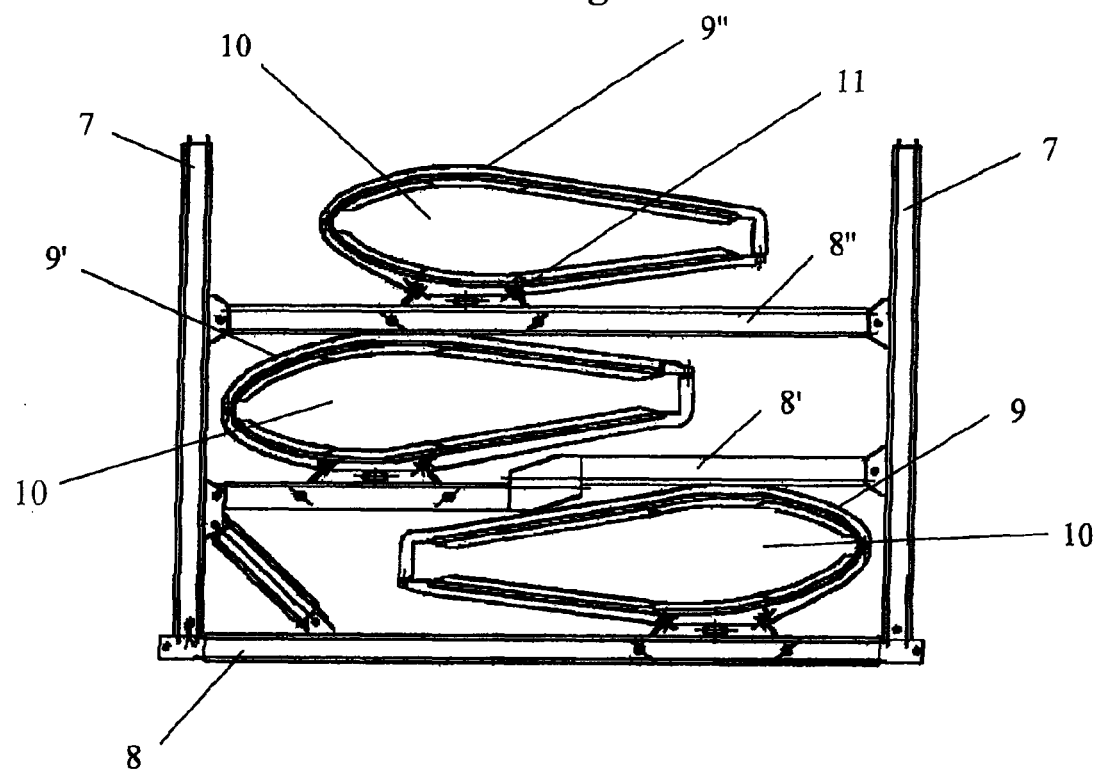
FIG. 2 is a transversal section view of the container showing the profile of the cradles that house the blades.

In FIG. 2, the walls (7) and the floor (8) form a gap where the cradles (9) are arranged to support the blade (10) at intermediate points of the container (1). Each cradle (9) rests upon the corresponding floor (8) of the container depending on whether it is arranged at the top (8" and 9"), in the middle (8' and 9') or at the bottom (8 and 9). The connection between each cradle (9, 9', 9") and floor (8, 8', 8") is made by means of a pair of supports (11) symmetrically arranged at the centre of mass of the blade (10).

Figure 3:
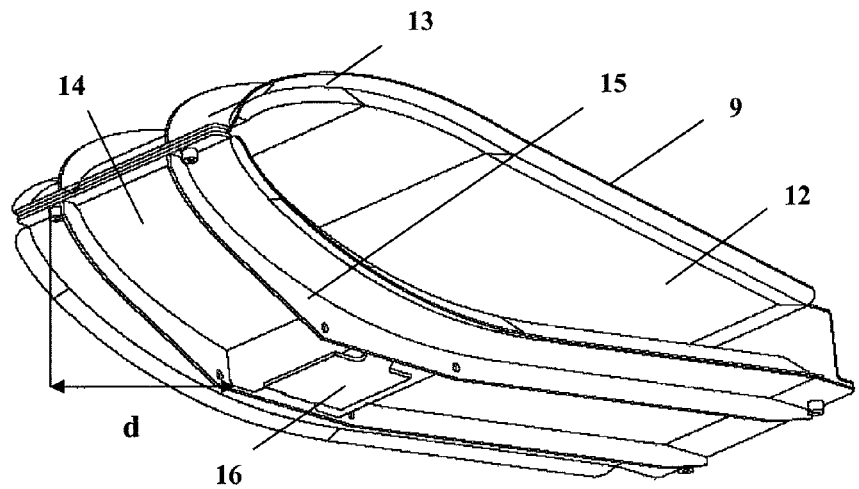
FIG. 3 is a perspective view of one of the cradles showing the lower part in detail.

As shown in FIG. 3, the cradle (9) has a contour which matches the profile of the blade (10) and incorporates a padded material along its inner surface (12). The outer part of the cradle (9) is formed by two opposing shells (13 and 14) which lock together at connection points which coincide with the leading edge and trailing edge of the blade. Both the upper shell (13) and the lower shell (14) have peripheral ribs (15) that encircle the entire cradle (9). The ribs (15) of the lower shell (14) form a platform (16) the width of which is the distance between the ribs and with a length of a similar dimension in the longitudinal direction. This platform (16) is located at a distance "d" from the leading edge of the cradle (9), with "d" being a third of the total length of the lower shell (14), according to this particular embodiment.

Figure 4:
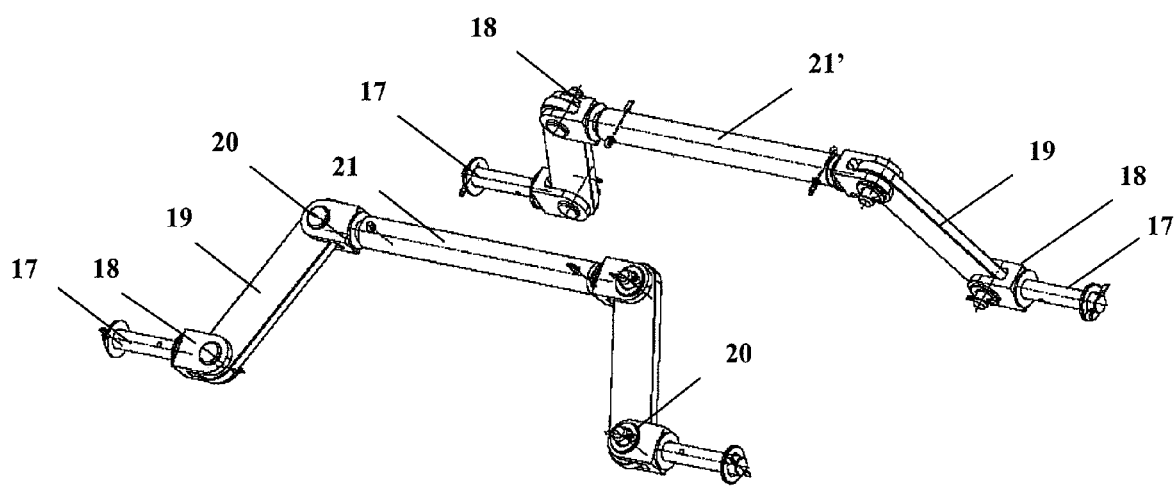
FIG. 4 is a perspective view of the cradle supports.

The support of this invention is formed by various elements connected together to configure an articulated quadrilateral, as shown in FIG. 4. Located the bottom ends of the support (11) are some pins (17) which have a clevis at the end (18) to enable them to be anchored to their corresponding rod (19) by means of a fixing pin (20). The same method is used at the opposite end of the rod (19) where in this case the pins (17) are connected together by means of a hollow pipe (21) which constitutes the top part of the support (11). The quadrilateral formed using this method can rotate lengthways as it is simultaneously articulated at four points. Equally, the conjunction of the first support (21) and the second support (21') creates a second articulated quadrilateral that facilitates the angular rotation of the unit.

Figure 5:
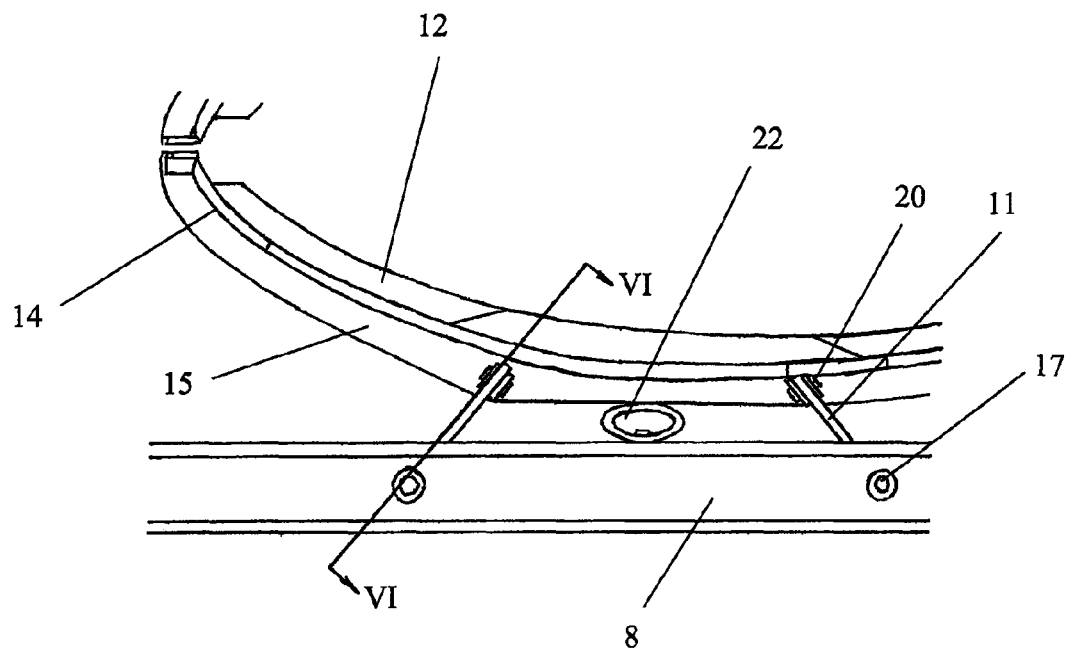
FIG. 5 is a detailed profile view of a cradle showing the implementation of the supports on the base of the cradle.

In FIG. 5, the floor (8) is connected to the bottom shell (14) of the cradle (9) by means of the supports (11) anchored by the pins (17). The supports (11) are inclined at an angle α in relation to the line of the floor (8), with a being greater than 0 and less than 90 degrees. The lower pins shown in the previous figure are anchored to the floor (8) and the upper pins located inside the hollow pipe (21) overlap the rib (15) of the lower shell (14). As previously mentioned, there is a platform (16) formed by a metal plate located between the ribs (15) of the lower shell (14). An elastically deformable element (22) preferably hollow and tubular in shape is located between said platform (16) and the floor (8).

Figure 6:
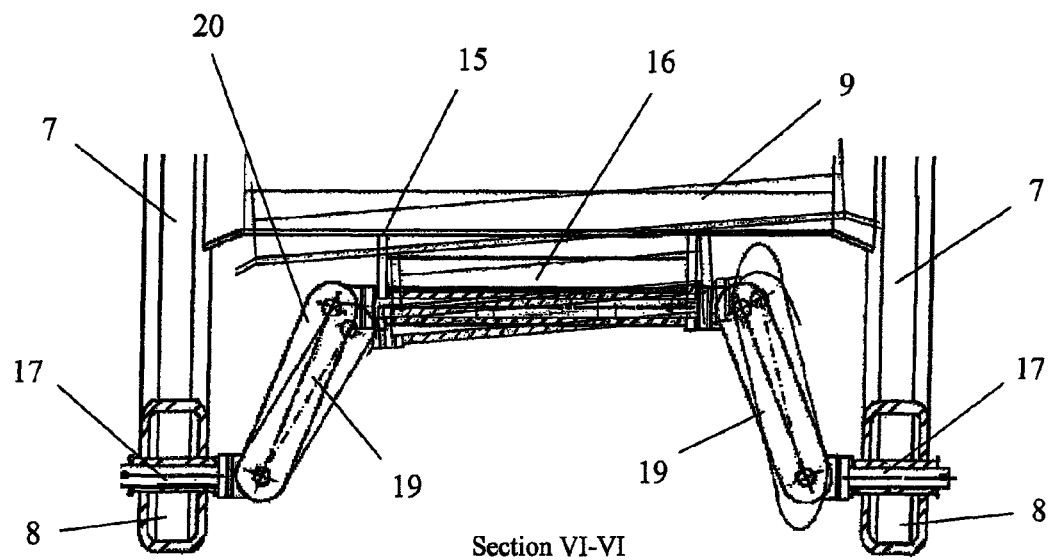
FIG. 6 is a section view taken on line VI-VI of FIG. 5 showing the lateral movement of the unit.

The length of the blades and the limited amount of existing intermediate supports inside the container favours the flexing of the blade which does not rest on the entire cradle but tends to create more load on one of its edges. As shown in FIG. 6, the flexure to which the blade is subjected along its length is compensated by the movement made by the cradle (9) in relation to the floor (8) of the container. The blade's lack of linearity is transmitted to the cradle (9) by means of a pin (17) which moves a rod (19) by means of the fixing pins (20) that it has at the ends. The movement of these rods (19) is transmitted to the cradle (9) by pipe (21) inserted between the ribs (15) of the cradle's lower shell. In this manner, the cradle tilts depending on the flexure of the blade thus ensuring that the weight of said blade is not loaded on only one edge of the intermediate support.

Figure 7:
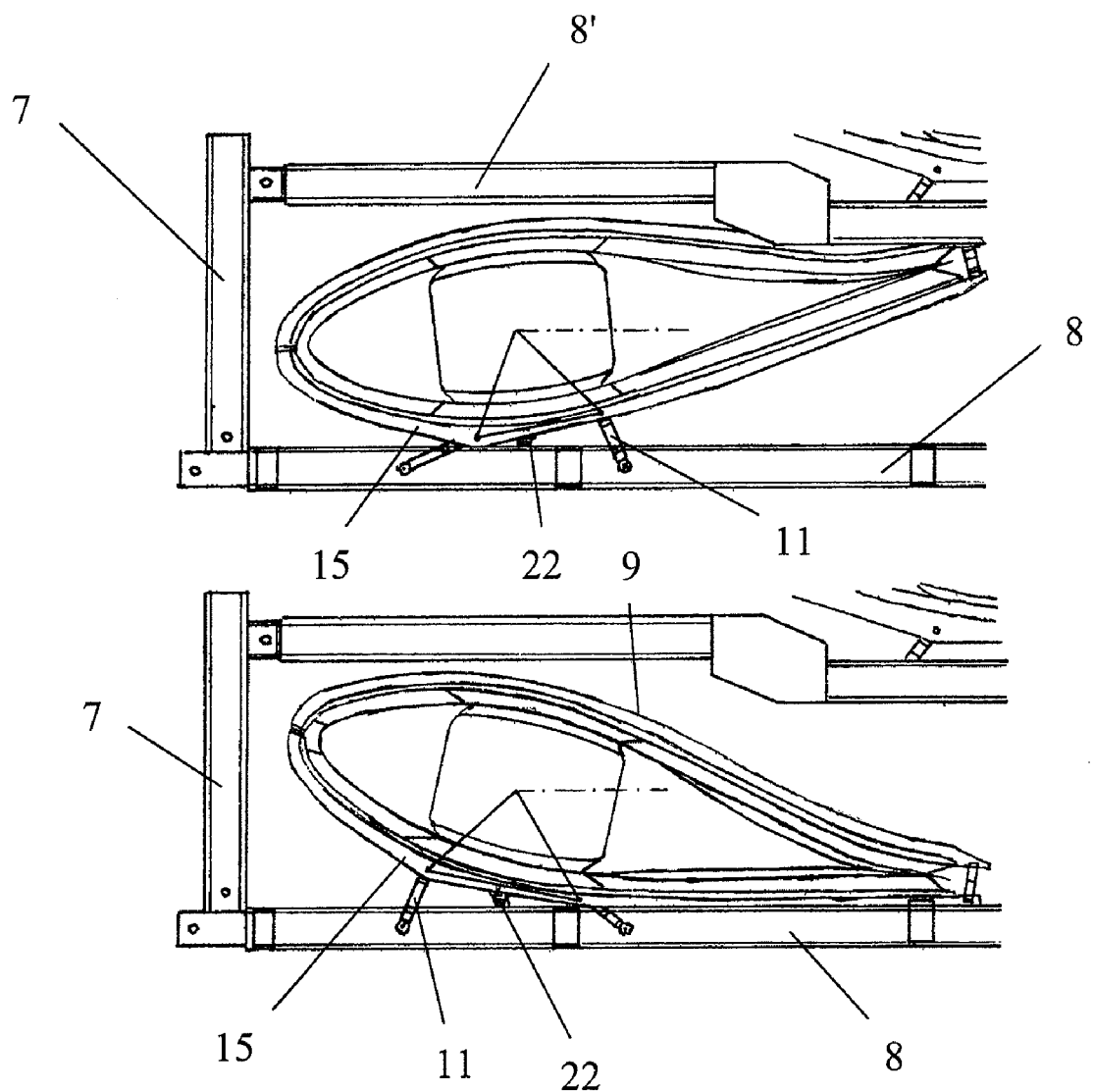
FIG. 7 is a profile view of the movement made by the cradle to absorb the torsion produced in the container and transmitted to the blade.

As shown in FIG. 7, the torsion caused in the container (1) during transport is transmitted by means of a group of trusses, bars and walls (7) to the floor (8) which in turn transmits it through the supports (11) to the cradle (9) which holds the blade. If the connection between the cradle and the floor is rigid, the torsion directly affects the blade and damages its structure. However, in this embodiment, the supports (11) rotate in an angular manner on its pins (17) creating cradle (9) movement and absorbing the torsion.

The invention claimed is:

1. In a support for transporting a blade, the support being anchored to a floor and supporting a cradle for supporting the blade at intermediate points of the cradle, with the floor and a plurality of trusses and bars forming a container in which the blade is transported, the improvement comprising:
    a plurality of interconnected elements constructed and arranged to allow lengthwise and angular rotation of the cradle;
    the support being located at a distance "d" from a leading edge of the cradle and inclined at an angle α in relation to the floor, and being inserted between ribs which run through a lower shell of the cradle and beams that form the floor.

2. The support for transporting a blade according to claim 1, wherein the plurality of interconnected elements include:
    pins inserted in the floor,
    a hollow pipe, and rods pivotally connected to the pins and the hollow pipe.

3. The support for transporting a blade according to claim 1, wherein the support includes two sets of elements, each located at one side of a platform formed between the ribs of the lower shell of the cradle, and each forming three sides of an articulated quadrilateral.

4. The support for transporting a blade according to claim 3, wherein a first set of the two sets of elements is located at one side of the platform at a distance of one third of a total length of the lower shell, and a second set of the two sets of elements is located at an opposite side of the platform.

5. The support for transporting a blade according to claim 1, wherein a rotation angle formed between the floor and the cradle may vary between 0 to less than 90 degrees.

6. The support for transporting a blade according to claim 1, further comprising a hollow cylinder of elastic material as an additional element located between a platform and the floor.

* * * * *